US008095463B1

(12) United States Patent
Hartmaier

(10) Patent No.: US 8,095,463 B1
(45) Date of Patent: Jan. 10, 2012

(54) SYSTEM AND METHOD FOR PREPAID ACCOUNT REPLENISHMENT

(75) Inventor: Peter Hartmaier, Woodinville, WA (US)

(73) Assignee: Openwave Systems Inc., Redwood City, CA (US)

( * ) Notice: Subject to any disclaimer, the term of this patent is extended or adjusted under 35 U.S.C. 154(b) by 0 days.

(21) Appl. No.: 09/365,426

(22) Filed: Aug. 2, 1999

(51) Int. Cl.
*G06Q 40/00* (2006.01)

(52) U.S. Cl. ........... 705/43; 705/41; 705/21; 705/26; 705/39; 235/380; 235/375; 235/381; 235/382; 902/1; 902/2; 902/8; 902/10; 902/12; 379/115

(58) Field of Classification Search .......... 705/43, 705/41, 21, 26, 39; 235/380, 375, 381, 382; 902/1, 2, 8, 10, 12; 379/115
See application file for complete search history.

(56) References Cited

U.S. PATENT DOCUMENTS

| 5,101,098 | A | | 3/1992 | Naito | 235/475 |
|---|---|---|---|---|---|
| 5,590,038 | A | * | 12/1996 | Pitroda | 395/241 |
| 5,644,118 | A | * | 7/1997 | Hayashida | 235/379 |
| 5,721,768 | A | | 2/1998 | Stimson et al. | 379/114 |
| 5,796,832 | A | * | 8/1998 | Kawan | 380/24 |
| 5,978,672 | A | | 11/1999 | Hartmaier et al. | 455/413 |
| 6,000,608 | A | * | 12/1999 | Dorf | 235/380 |
| 6,044,247 | A | * | 3/2000 | Taskett et al. | 455/31.2 |
| 6,047,179 | A | * | 4/2000 | Kirby | 455/432 |
| 6,185,545 | B1 | * | 2/2001 | Resnick et al. | 705/40 |
| 6,246,755 | B1 | * | 6/2001 | Walker et al. | 379/115 |
| 6,257,487 | B1 | * | 7/2001 | Hayashida | 235/380 |

FOREIGN PATENT DOCUMENTS

| WO | WO 97/04579 | * | 2/1997 |
|---|---|---|---|
| WO | WO 98/25237 | | 6/1998 |
| WO | WO 98/34393 | | 8/1998 |
| WO | WO 98/47112 | | 10/1998 |
| WO | WO 99/25106 | | 5/1999 |

* cited by examiner

*Primary Examiner* — Daniel Felten

(57) ABSTRACT

A system and method for replenishing prepaid account balances is disclosed. Consumers are issued a prepaid account card similar to a credit card. Funds are added to prepaid accounts at retail locations by providing cash or equivalent to a clerk along with the prepaid account card. The clerk swipes the prepaid account card in an authorization terminal and rings up the transaction in a manner similar to a normal credit card transaction. The transaction is transmitted to a bank which processes the transaction and notifies a replenishment system that the customer has added value to the prepaid account. The replenishment system provides the customer with a confirmation number associated with the transaction. The replenishment system notifies a prepaid engine for the prepaid account. The prepaid engine updates the user's prepaid account balance, thereby making funds available for future purchases by the user. The user may also add funds to the prepaid account via an automated teller machine (ATM), via the Internet or by dialing certain feature codes on a wireless telephone.

8 Claims, 3 Drawing Sheets

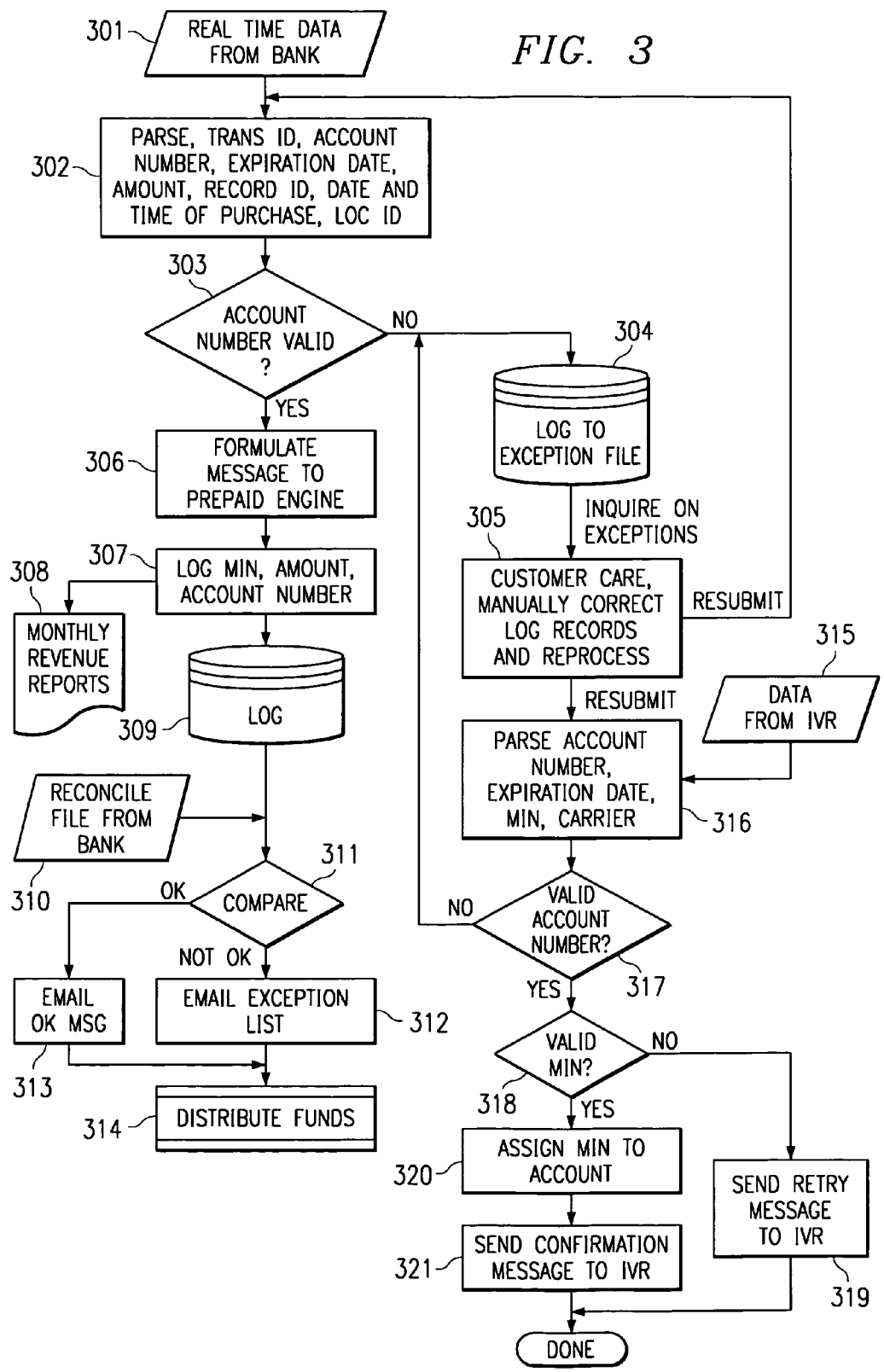

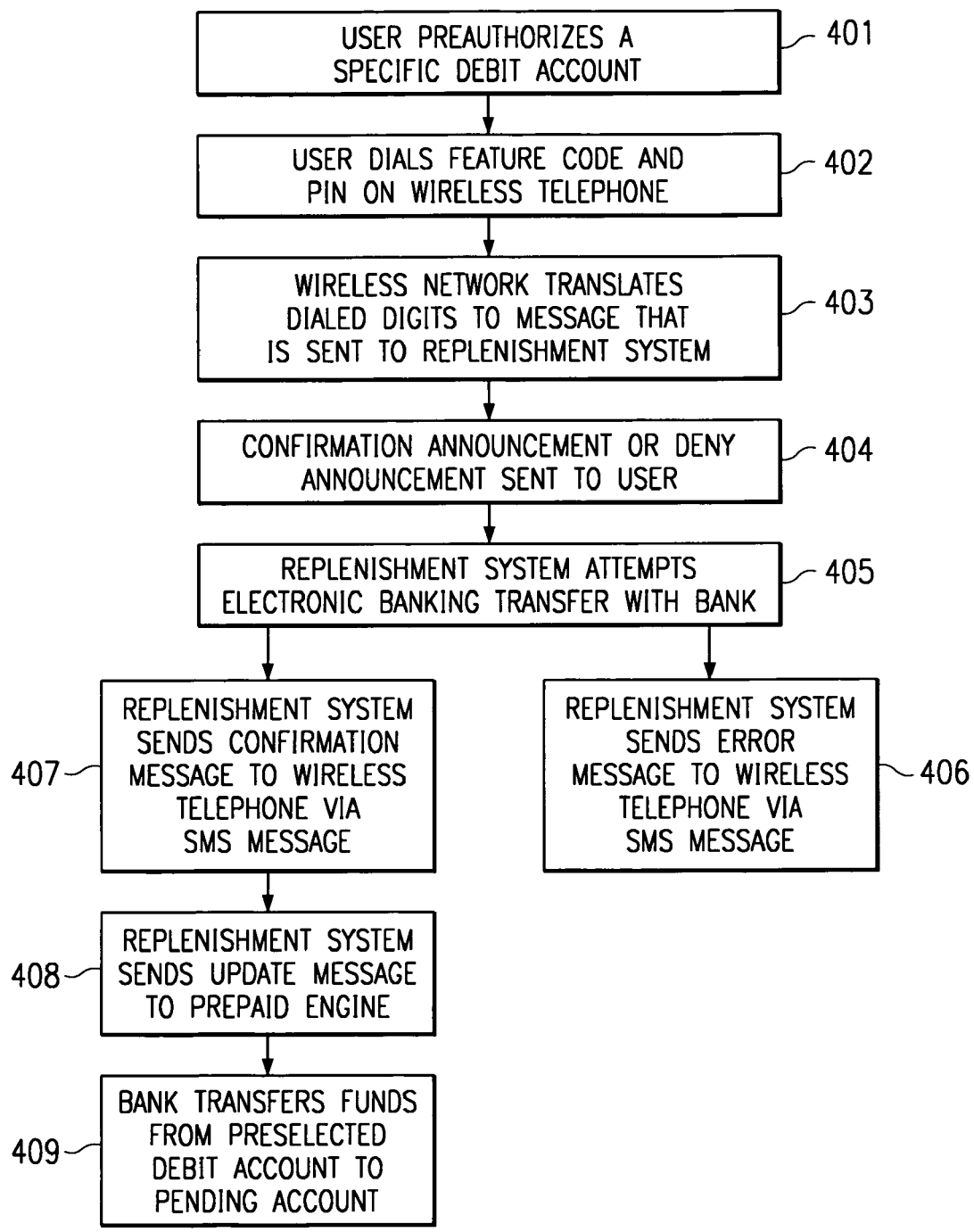

SYSTEM AND METHOD FOR PREPAID ACCOUNT REPLENISHMENT

TECHNICAL FIELD

This application relates generally to the use and replenishment of prepaid accounts that are used to purchase goods or services and more specifically to a system and method for replenishing prepaid accounts for wireless telephone service.

BACKGROUND

Credit, debit and prepaid calling card services are known and are used to purchase goods and services. Traditionally, prepaid accounts were used by consumers that had a poor or unestablished credit history or by consumers who did not desire to use any credit card. However, more recently, prepaid calling services are increasingly used by consumers who simply wish to pay cash, who do not want to give out credit information or who believe they will receive a better long distance rate with a prepaid calling card. A prepaid calling service allows consumers to charge telephone calls made from both wireline and wireless telecommunications system against a prepaid account. Calls made through the prepaid service provider's system are charged against the customer's prepaid account. Typically, a customer may purchase a prepaid calling card from a retail outlet or from vending machines located at various sites. Calling cards are available in various denominations and by purchasing such a calling card a consumer is essentially purchasing a fixed amount of call time that will be metered out depending on the specifics of each call.

Prepaid account replenishment is currently supported by schemes wherein carriers sell prepaid cards at retail outlets. There are two different prepaid schemes in use today, one for long distance (LD) and one for wireless. They differ in the method of use. LD prepaid allows the consumer to use any phone to place a pre-paid call. Each call requires the consumer to dial a prepaid access number, which is typically an 800 toll free number. Then the user enters a prepaid account number from the prepaid card and the actual number to be called. The database tracks the amount on the prepaid account. If the balance is non zero the process can be repeated until a zero balance is reached. At that point (zero balance) the account is void and the consumer has to purchase another card with another account number. These account numbers are sometimes called "PINs". The wireless prepaid operation is different in that the wireless consumer is only allowed to place and receive the prepaid calls from one wireless telephone. The consumer purchases a prepaid card as in the LD prepaid case and then calls an 800 number. For wireless prepaid, the user enters the telephone number of the wireless telephone and the PIN from the card. From then on, the prepaid value is associated with the wireless telephone and not with the prepaid account, and the wireless phone can be used in a normal manner to place calls. Typically, a wireless customer buys a wireless phone and is provided with a prepaid card. The customer then breaks a seal on the card to reveal a code. The customer may then call a toll-free number provided with the card to activate the account. To activate the account the customer has to provide his telephone number and the code on the card. The wireless service provider then correlates the code with a database to determine the amount on the card and credits the customer's wireless telephone with the purchased amount. The customer may then utilize wireless services of the carrier against that account up to the balance in the customer's prepaid account. Once such an account has been credited to the wireless phone account, the physical card itself becomes useless and is disposable.

Once the customer has used up the balance in the prepaid account, he has to purchase another card from the retail outlet and go through the same process of replenishing the account. There are many problems inherent in the prior art. The customers have to find a retail outlet that sells such cards every time the customer desires to replenish his or her account. This requirement can be burdensome, especially for roaming customers. Furthermore, customers have to purchase new cards with new codes and possibly different toll-free numbers to call each time they want to replenish their account. Furthermore, with wireless services, they have to make sure that the prepaid calling card they purchase at retail outlets are accepted by their wireless carrier.

Since most prepaid calling cards are purchased through retail outlets, there are overhead expenses associated with marketing these cards. Thus, existing prepaid calling cards inherently have a retail distribution chain mark up in the card's cost. This adds an expense to the prepaid calling card that is not recovered by the user in extra calling time. Thus, there is a need in the art for a system to allow prepaid customers to replenish their accounts at an increased number of locations and at the same time reducing the markup associated with such retail distribution to reduce the cost of prepaid services.

The existing scheme of selling cards requires that all outlets have stock of prepaid cards. This may have been possible when prepaid phone only operated within defined geographic areas, however, wireless prepaid networks are now being enhanced to allow roaming. Wireless networks will allow prepaid customers to roam and use wireless telephones virtually anywhere in the United States and the world. Thus, it is extremely important that consumers have access to a large number of distribution points to enable them to replenish their prepaid accounts or have access to a network that will allow then to replenish from virtually anywhere.

SUMMARY OF THE INVENTION

The present invention allows prepaid customers to replenish a prepaid service account at retail locations, at Automated Teller Machines (ATMs), via the Internet or even via the wireless telephone itself. In one embodiment, the consumer receives a permanent prepaid account card incorporating information that identifies the prepaid account. The consumer adds value to the prepaid account at any location that accepts conventional credit cards. When the customer needs to replenish his account, he presents the card at a retail outlet and indicates to the sales clerk that the transaction is a replenishment transaction. The user provides the clerk with cash or equivalent and the clerk then rings up the sale by swiping the prepaid card like a conventional credit card. The replenishment transaction is processed by a bank connected to the retail location and sent to the replenishment system for authorization and confirmation. The user is provided with a receipt indicating the amount of sale and a transaction number to confirm the transaction.

The banking network of a credit card provider processes the transaction and forwards the transaction to the replenishment service provider. The replenishment service provider then updates the customer's prepaid account with the amount of replenishment and informs the customer of the replenishment within minutes of the initial transaction. The customer may now use the prepaid account balance to purchase services and products from participating merchants.

The advantage of the present invention is that it uses an existing network of credit card services to allow customers to replenish their prepaid accounts. Thus, the overhead associated with prior art systems which use disposable calling cards is reduced. At the same time, the present invention allows customers greater flexibility and provides them with a choice of retail outlets to replenish their prepaid accounts. Customers would no longer be limited to purchasing prepaid calling cards from the limited number of specialized retail outlets that provide these services. Furthermore, the costs associated with maintaining a separate network to provide prepaid services is eliminated. Also, due to the reduction in overhead costs, prepaid services may now be provided to consumers at a lower cost, thus making the prepaid market attractive to more consumers who had until now stayed away from this market. Since the present invention uses a form of credit card transaction to replenish a customer's account, prepaid service providers may now reach a national consumer base that is already using existing credit card networks. Furthermore, since the account is replenished over a credit card network, any retail outlet that honors credit card transactions can be used to replenish a prepaid account.

Where the prepaid service is the use of a wireless telephone, the wireless device itself may be used to initiate replenishment transactions. The unique Mobile Identification Number (MIN) assigned to each wireless telephone may be used to authenticate transactions for a particular account.

The present invention is not limited to prepaid telephone services nor does it require possession of a prepaid account card. Prepaid credit accounts of any kind can be replenished using the systems and methods described herein.

An object of the present invention to provide enhanced prepaid services to consumers while reducing the cost of providing prepaid services and allowing customers to replenish their prepaid accounts at a number of locations.

A further object of the present invention is to use an existing network to facilitate such replenishment and to update the customer's account soon after an authorized agent receives cash so that the customer may use the replenished account within minutes of replenishment. Customers may also replenish prepaid accounts using ATMs or the Internet or by dialing certain feature codes on a wireless telephone.

Still a further object of the present invention is to allow the customer to use the new balance to purchase services and products over the Internet or other communications medium.

The foregoing has outlined rather broadly the features and technical advantages of the present invention in order that the detailed description of the invention that follows may be better understood. Additional features and advantages of the invention will be described hereinafter which form the subject of the claims of the invention. It should be appreciated by those skilled in the art that the conception and specific embodiment disclosed may be readily utilized as a basis for modifying or designing other structures for carrying out the same purposes of the present invention. It should also be realized by those skilled in the art that such equivalent constructions do not depart from the spirit and scope of the invention as set forth in the appended claims.

BRIEF DESCRIPTION OF THE DRAWINGS

For a more complete understanding of the present invention, and the advantages thereof, reference is now made to the following descriptions taken in conjunction with the accompanying drawing, in which:

FIG. 3 is a flowchart of one embodiment of the steps followed by a replenishment system to process replenishment transactions; and FIG. 4 is a flowchart of exemplary steps followed in a replenishment transaction using a wireless telephone.

DETAILED DESCRIPTION

Figure 1:
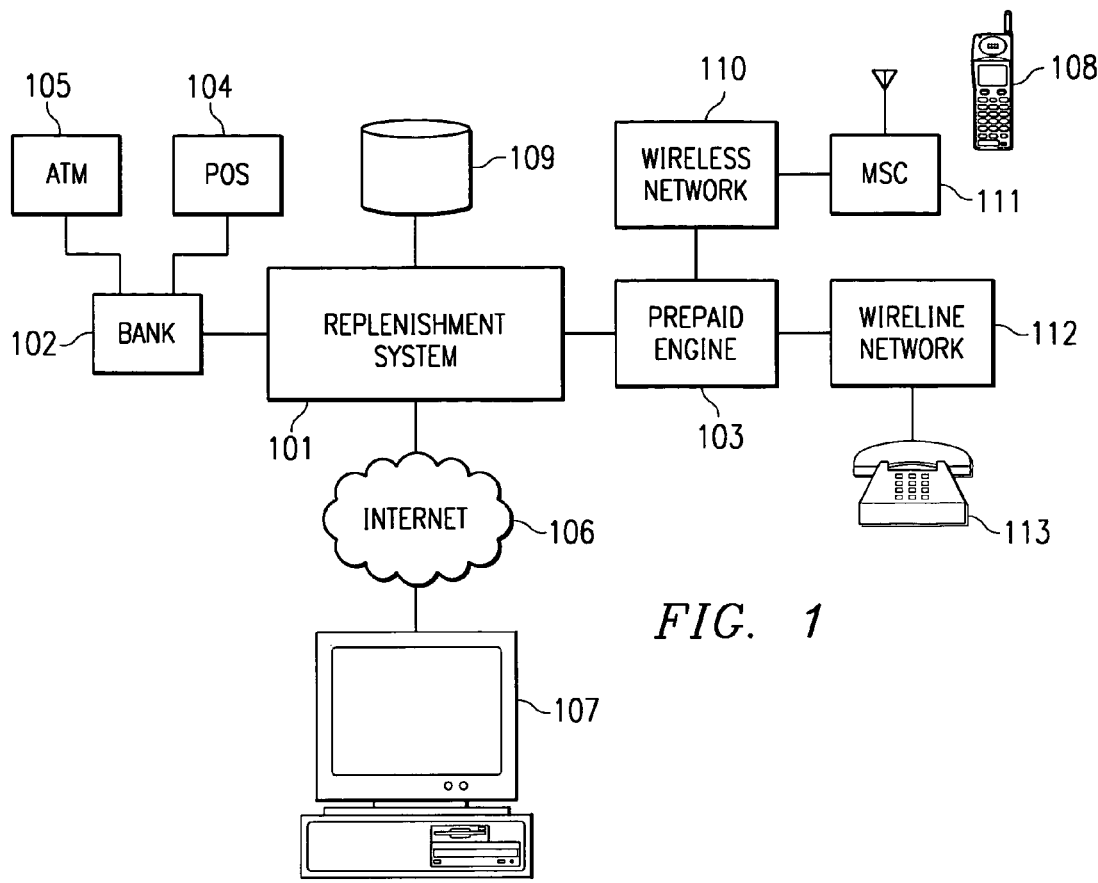
FIG. 1 is a block diagram of one embodiment of a prepaid account replenishment system.

FIG. 1 is a high level block diagram illustrating the components of an exemplary system 10 for providing prepaid account replenishment. System 101 provides the replenishment capability by serving as an interface between with bank 102 and prepaid engine 103. It will be understood that in the present invention the term "bank" can mean a banking institution or any system that supports a point of sale network. For example, bank 102 is not necessarily a true bank, but it 102 can be credit card transaction processor. Bank 102 maintains a number of accounts for handling the funds involved in the replenishment transactions. A number of geographically diverse terminals, such as POS 104 and ATM 105, provide consumers and prepaid account users with locations for completing prepaid account replenishment transactions. Point of Sale (POS) terminal 104 and Automated Teller Machine (ATM) 105 are linked to bank 102 and exchange financial transaction data with bank 102. In other embodiments, users can perform replenishment transactions via Internet 106 and Personal Computer (PC) 107 or via the user's mobile phone 108. Replenishment system 101 may be coupled to database 109, which is used to store information about users, banks, points of sale, prepaid accounts and the like.

Prepaid engine 103, which is known in the art and will not be described in detail herein, monitors and verifies current prepaid account balances. Wireless service providers are in communication with prepaid engine 103 to ensure that users have sufficient funds to pay for calls. Wireless telephone 108 is in communication with a wireless network. For example, wireless device 108 communicates with wireless network 110 via Mobile Switching Center (MSC) 111. Users may also communicate via a wireline network, such as network 112, using wireline telephone 113. Other well known wireless or wireline infrastructure and equipment, such as base stations, switching offices and signaling nodes, are not shown in FIG. 1 to simplify the diagram.

In one exemplary embodiment, a consumer will desire to use a prepaid account to pay for wireless telephone service. In this example, the user will be issued a permanent account card, similar to a credit card, which uniquely identifies the user's prepaid account. The user may receive the account card upon purchasing a wireless telephone. Alternatively, the user may already have a wireless telephone and therefore he or she only needs to receive an account card to use the prepaid service. In either case, the user is issued the permanent account card and the card is activated for use. As part of the activation process the card is uniquely associated with the consumer's wireless telephone or telephones. More than one card may be associated with a particular wireless telephone.

The permanent account card has no value in and of itself and serves only as a means of transmitting a prepaid account number to facilitate replenishment transactions. However, the account card is associated with a prepaid account at replenishment system 103. Wireless device 108 is also associated with the prepaid account at prepaid engine 103 and with prepaid account number in replenishment system 103 during the account card activation process. Upon activation of the permanent account card, an initial sum of money is deposited into the prepaid account. The user is then able to make and receive calls via wireless telephone 108. The cost of calls to and from wireless telephone 108 are charged to the prepaid account at a previously agreed to rate. Systems and methods for completing wireless or wireline telephone calls using a prepaid account are known in the telecommunications industry and, therefore, will not be further discussed herein. As the user makes and receives calls via prepaid wireless telephone 108, the prepaid account balance is reduced and eventually the user will have to make a deposit to the depleted account in order to make additional calls.

The permanent account card preferably has an account number that indicates an issuing bank or other institution operating the replenishment system 101, and the specific prepaid account. In addition, the card may comprise other features that facilitate replenishment transactions, such as a magnetic stripe that duplicates the account number and that can be read by swiping the card through a card reader. The account card may also comprise a Universal Product Code (UPC) or machine readable bar code that identifies the card as a prepaid account card. As discussed above, the account card may be issued with a new wireless telephone or the account card may be issued separately. The account card can be activated by the user in person at a retail location when the user receives the card or the user may activate the card by calling a Customer Service Representative (CSR) or an Interactive Voice Response (IVR) system. Information, such as the wireless telephone number, the Mobile Identification Number (MIN), the wireless carrier identity, the prepaid account card number and the like is provided to replenishment system 101 to activate the card.

Figure 2:
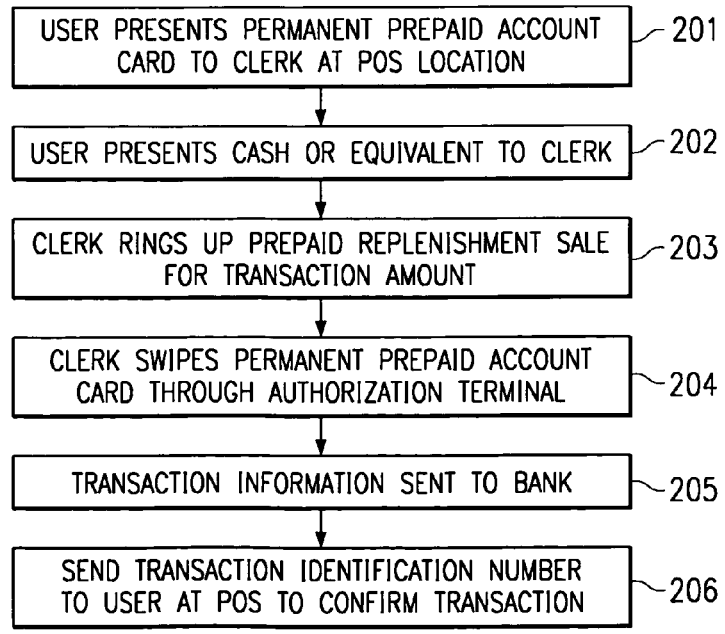
FIG. 2 is a flowchart of exemplary steps followed in a point of sale replenishment transaction.

In the preferred embodiment, the user will be able to replenish the prepaid account at any location that is capable of conducting credit card transactions. The replenishment transaction may be performed by following the steps illustrated in the flowchart of FIG. 2. In step 201, the user presents the permanent prepaid account card to a clerk at point of sale location 104. The user also provides cash or the equivalent for the amount of money that is to be added to the prepaid account in step 202. It will be understood that the user can provide replenishment funds in any form that is acceptable to the retail location, such cash, check, money order, credit card and the like. The clerk rings up the Prepaid Replenishment Transaction or sale in step 203 for the amount of the transaction. To facilitate the transaction, the clerk may scan a UPC code on the permanent account card. In step 204, the clerk swipes the permanent prepaid account card through an authorization terminal in the same manner that a credit card or debit card is swiped in known systems. The authorization terminal is preferably the same terminal that is used for performing credit card and/or debit card transactions. However, the authorization terminal may be a separate device that is specifically used for the prepaid replenishment transactions described herein.

The authorization terminal at point of sale location 104 is coupled to bank 102. In step 205, transaction information, such as an account number and an amount of funds to be credited to the prepaid account, is sent to bank 102, which recognizes the transaction as a prepaid account replenishment transaction. Bank 102 then confirms the transaction in step 206 by sending a transaction identification number or confirmation number to the user at POS location 104 after bank 102 has received confirmation from the replenishment system 101. The transaction number will be unique such that it will not be reused for a specified period of time, such as no repeated numbers for 24 months. The transaction number may include checksum digits that can be used to verify the validity of the number. The user may receive a receipt that indicates the transaction amount and the transaction identification number. The transaction identification number can be used later to identify a specific transaction in order to correct any errors that occurred during the transaction, such as a failure to properly credit the designated prepaid account. Preferably, once the transaction is complete and the user is issued a transaction number, the user can immediately use wireless telephone 108 to make calls that are charged against the prepaid account. Alternatively, there may be a delay before the prepaid engine is updated while bank 102, replenishment system 101 and prepaid engine 103 process the transaction.

The transaction funds remain in pending or revenue accounts at bank 102 and they are not actually transferred to replenishment system 101 or prepaid engine 103. Instead, bank 102 will notify replenishment system 101 that the user has deposited a certain amount of funds that are to be credited to a particular prepaid account for the wireless carrier. Replenishment system 101 acts as an interface between bank 102 and prepaid engine 103. Bank 102 formats transactions into separate transaction records and sends them to replenishment system 101 in real time. Preferably there is a dedicated link between bank 102 and replenishment system 101. The transaction records include information such as a transaction number or confirmation number provided to the user, a transaction record identification number, date of purchase, time of purchase, location of purchase, amount of transaction, and the like. Each transaction will be processed by replenishment system 101 and the transactions are acknowledged after the information is stored in a non-volatile memory, such as database 109.

Replenishment system 101 will authorize prepaid transactions only after verifying certain information in the transaction record. For example, the transaction will be authorized only if the permanent account card number has been activated and only if the location identification is correlated to a list of authorized replenishment locations. Replenishment system 101 will also verify that the transaction identification number is not a duplicate of a previously used number.

Replenishment system 101 sends a transaction message to prepaid engine 103 for each prepaid replenishment transaction. The transaction message includes information such as the transaction identification number, the transaction amount, and the Mobile Identification Number (MIN) or other identification for wireless telephone 108. The replenishment system 101 supports multiple prepaid engines 103 each of which may be associated with different wireless operators. A replenishment system 101 database will route replenishment transaction information to the correct prepaid engine based on the association established during the activation process. Each transaction message that is sent to prepaid engine 103 is logged. Preferably, the transaction messages to prepaid engine 103 are sent immediately following the receipt of a corresponding transaction record from bank 102 in order to minimize the time between the prepaid transaction and the availability of funds for prepaid calls.

Once every day, bank 102 will transfer a reconciliation file to replenishment system 101. The reconciliation file will comprise the information for every transaction record that was sent in the previous 24 hours. This allows replenishment system 101 to compare the bank's transaction records with the transaction records that are sent in real-time. Any records that do not match between the reconciliation file and the individual transaction records will be logged to an exception file. A replenishment service provider can access the exception file to resolve any unreconciled transactions.

After processing the reconciliation file, replenishment system 101 calculates the disbursement of funds and executes an online banking transaction to move funds into the correct accounts. Funds deposited by users will be allocated to the replenishment service provider, the wireless carrier, the retailer at point of sale locations, the bank and other entities involved in the replenishment transactions. It is expected that the retailer, the bank and the replenishment service provider would each receive a predetermined percentage of each transaction or a preselected fee for each transaction. The wireless service provider will typically receive the remaining funds, which will be used to pay for prepaid calls.

Replenishment system 101 will provide other features related to the replenishment transactions, such as the capability to reverse transactions, to correct transactions or to force transactions. Under certain conditions bank 102 may desire to cancel or reverse a transaction. In such a situation, bank 102 will send a reversing transaction, which identifies the initial transaction. Replenishment system 101 will search for the transaction number of the original transaction and then verify that the account number and transaction amount of the original transaction match the reversing transaction. If the original and reversing transactions match, replenishment system 101 verifies the reverse transaction with bank 102 and sends a reversing entry to prepaid engine 103. If the original transaction has not yet been sent from replenishing system 101 to prepaid engine 103, then upon receipt of a reversing transaction replenishment system 101 can delete the original transaction from a queue of messages to be sent to prepaid engine 103. If the transaction number for an original transaction cannot be matched to the reversing transaction, then replenishment system 101 will assume that the original transaction was not completed and no changes will be made.

Bank 102 may need to make corrections to the transaction records, for example if a clerk entered the wrong transaction amount. In such situations, bank 102 may manually correct the transaction records by sending a reversing transaction for the original transaction and a new transaction for the correct amount. The reversing transaction and the correction entry shall contain the same transaction identification code.

In the preferred embodiment, prepaid replenishment transactions will not be allowed when the link between bank 102 and replenishment system 101 is down. However, in alternative embodiments, bank 102 may accept prepaid transactions even when replenishment system 101 is offline. Thereafter, when the link between bank 102 and replenishment system 101 is reestablished, bank 102 will provide transaction records for all transactions made while replenishment system 101 was offline.

All connections between bank 102, replenishment system 101, and prepaid engine 103 are dual so that no single point of failure exists in the prepaid replenishment system. All transactions between and among bank 102, replenishment system 101, and prepaid engine 103 will be acknowledged within a preset time limit. Failures during a transaction will be detected when an acknowledgment is not received within the preset time limit. During such as failure, the transmitting device will time out awaiting acknowledgment and either cancel the transaction or resend the information. Any resent information, such as a transaction record or message, will include the same transaction identifier as the original information so that duplicates can be identified if both sets of information are received.

Customer service representatives (CSRs) for the wireless carrier and/or the replenishment system provider will have access to replenishment system 101 and database 109 to allow verification and correction of individual transactions and customer records. Read/write access to individual records and record entries shall be selectable depending upon the querying party's authorization to access the record. For example, a wireless carrier may be allowed to access transactions involving only their customers regardless of which bank or point of sale is involved in the transactions. CSRs shall have the capability to update and correct accounts, including updating or correcting the MIN, carrier, or account number. CSRs may also search for and correct prepaid transactions.

FIG. 3 is a flowchart illustrating one embodiment of the operation of replenishment system 101. In step 301, replenishment system 101 receives real time replenishment transaction data from bank 102. This data is then parsed into its component elements in step 302. Replenishment system 101 verifies the account number in step 303. The account number verification step may involve a number of substeps, such as using checksum digits, checking that the account is not expired, verifying that the account number is within a valid range and/or that a valid MIN is assigned to the account. If the account number fails in step 303, then the transaction is logged to an exception file in step 304. The exception file may be used by a CSR or by bank 102 in step 305 to manually correct any incorrect or missing account information. Once the information has been corrected, the transaction may be resubmitted for processing in step 301. Preferably, replenishment system 101 includes fraud prevention and control checks in step 305 to identify and prevent fraudulent attempts to credit prepaid accounts.

Valid account transactions are further processed in step 306, wherein a transaction message is formulated for prepaid engine 103. This transaction message is sent to prepaid engine 103 to update the user's prepaid account balance for future calls. Replenishment system 101 logs the MIN, transaction amount, account number and other information in step 307. This transaction information is then used to track the replenishment transactions or to generate reports, such as monthly revenue reports in step 308. Revenue reports may be generated for each carrier or for each bank. The transaction information is stored in a database in step 309. At preset intervals, such as every 24 hours, in step 310, bank 102 sends a reconciliation file summarizing all transactions during the period. In step 311, replenishment system 101 compares the reconciliation file to the log of individual transactions to verify that all transactions have been recorded correctly. An email message is generated in step 312 identifying any exception cases that do not match between the reconciliation file and the transaction log. These records are then analyzed to resolve any discrepancies. In step 313, replenishment system 101 sends a message to bank 102 containing instructions on how the funds are to be distributed among the bank, retailer, and wireless service providers' accounts.

FIG. 3 also illustrates series of exemplary steps to be performed when activating prepaid account cards using an IVR system. In step 315 replenishment system 101 receives data from an IVR system. This information is parsed into its component parts in step 316 and the account number is verified in step 317. The account number can be verified on activation by using a checksum, verifying that it is not expired and that the account number is within a valid range. If the account number fails step 317, then the information is logged to an exception file in step 304 and the user can be connected to a CSR or customer care facility in step 305 to resolve the errors. Once the account number problems have been corrected, the activation process is restarted in step 316.

Activation information including valid account numbers is then checked in step 318 to verify that the MIN is valid. If the MIN is not valid, then a message is sent to the IVR to prompt the user to reenter the MIN information in step 319. Alternatively, the user may be connected to a CSR to resolve the MIN errors. If the account number and the MIN are both valid, then the MIN is assigned to the prepaid replenishment account in step 320 and a confirmation message is sent to the IVR in step 321. The IVR then informs the customer that the account is active and the prepaid replenishment card can be used.

Replenishment system 101 monitors all transactions for fraud attempts and logs all fraud attempts to a fraud file. Specialized reports are then generated from the fraud file to aid in fraud detection. System 101 also provides bank 102 and the prepaid service provider an audit trail for accounting of all funds involved in the replenishment transactions.

In addition to using a point of sale location to replenish the prepaid accounts, in other embodiments users may use an ATM to add funds to a prepaid account. For example, bank 102 may provide replenishment services such as processing of transactions from POS 104. Bank 102 may also provide a replenishment transaction via its ATMs 105. Upon swiping or inserting their debit or bank card, users may be offered the typical options of withdrawing, depositing or transferring funds into or among accounts at bank 102. ATM 105 may be configured to also offer the option to transfer money from the user's checking or savings account to the user's prepaid account. The user then selects the transaction amount and confirms the transaction. Bank 102 then notifies replenishment system 101 of the transaction and the user's account balance in prepaid engine 103 is updated.

Alternatively, ATM 105 may be configured so that the user can swipe more than one card during a transaction. For example, the user would first swipe a debit or bank card to identify the account to remove funds from and then swipe a permanent prepaid account card to identify the prepaid account to which funds are to be deposited. Bank 102 would then inform replenishment system 101 that the user's prepaid account should be credited a certain amount.

In another embodiment, the user may access replenishment system 101 via PC 107 to transfer funds to a prepaid account. For example, the user may access replenishment system 101 through a web site via Internet 106 or the user may access replenishment system 101 directly through a proprietary computer interface or network. Replenishment system 101 would prompt the user for an identification code and a Personal Identification Number (PIN) or password before conducting the prepaid transactions. When activating the prepaid account, the user may identify a specific bank account to be debited for replenishment transactions. Thereafter, whenever the user desires to replenish the prepaid account, he or she can access replenishment system 101 via PC 107 and, after entering an identification code, PIN or password, the user can transfer funds from the preselected debit account to the prepaid account. Replenishment system 101 will then send a message to bank 102 to verify that the funds are available in the debit account and, if they are available, to transfer the replenishment amount to the appropriate pending account. Replenishment engine 101 will send a confirmation message to the user at PC 107. The confirmation message may include the prepaid account number, a transaction or confirmation number and the amount transferred. Replenishment system 101 also sends a message to prepaid engine 103 to update the prepaid account balance for the user.

FIG. 4 is a flowchart illustrating the steps involved in another embodiment of the replenishment system in which the user adds value to a prepaid account via wireless telephone 108. In step 401, the user preauthorizes a specific account that will provide funds to replenish the prepaid account. This debit account may be predesignated by the user during activation of the replenishment account. To replenish the prepaid account, the user enters the appropriate dialed digits in step 402. The dialed digits can be any length and may include a feature code, telephone number, transaction amount, PIN or other information. Certain feature codes may be correlated to specific replenishment amounts. For example, "*25" may correspond to a $25 replenishment transaction. Accordingly, when the user enters the feature code plus a PIN, wireless network 110 converts the dialed digits in step 403 to a message to replenishment system 101. Continuing the example, the user may send the dialed digits "*25123456", wherein "*25" is a feature code and "123456" is the PIN. This information is converted to a message to be sent to replenishment system 101. Using the "*25" feature code, the system knows that the transaction amount is to be $25. Signals from wireless telephone 108 include the MIN assigned to the device and this information can be used to uniquely identify a specific wireless telephone and an assigned prepaid account. The wireless network further confirms the validity of the phone through existing authentication methods.

In one embodiment, wireless network 110 converts the dialed digits and MIN to an OriginationRequest message that is used to initiate the transaction. Wireless network 110 interfaces with replenishment system 101 and then, in step 404, sends a confirmation tone or announcement to the user to indicate that the replenishment transaction is being performed. No call is actually completed to the replenishment system 101. Alternatively, if the transaction cannot be sent to replenishment system 101, then a deny announcement or tone will be sent to the user. After sending the appropriate tone, the call connection between wireless telephone 108 and network 110 can be broken while replenishment system 101 attempts to complete the transaction.

In step 405, replenishment system 101 attempts an electronic banking transaction with the user's bank. If replenishment system 101 is unable to contact bank 102 or if the banking transaction fails, then replenishment system 101 initiates an email or Short Message Service (SMS) message to wireless telephone 108 in step 406 to notify the user that the transaction failed. If the transaction is successfully processed by bank 102, then in step 407 replenishment system 101 initiates an SMS message to wireless telephone 108 indicating that the replenishment transaction was completed. The SMS message may comprise a transaction number, the amount transferred or other such information. In step 408, replenishment system 101 sends a message to prepaid engine 103 to update the prepaid account balance for the user. In step 409, bank 102 transfers funds from the user's predesignated account to the appropriate account for prepaid transactions.

It will be understood that, although the exemplary system described above was directed to the replenishment of a prepaid wireless telephone services account, the present invention can be used to replenish prepaid accounts for wireline telephone service. For example, a prepaid account that is used for wireline telephone services may also be replenished in the manner described above. A user may desire to make calls from wireline telephone 113 using a prepaid account. Whenever the account for prepaid wireline services needs to be replenished, the user may add funds to the account via a point of sale location 104, ATM 105, or PC 107. Alternatively, the user may perform replenishment transactions from telephone 113 by dialing a predetermined replenishment telephone number. The user may then be connected to an IVR system that prompts the caller for account number information and a transaction amount. Such an IVR system may be incorporated with replenishment system 101.

If the user predesignated a prepaid account that is to be associated with telephone 113, then the caller identification (caller ID) functions, such as calling number delivery or automatic number identification (ANI), can be used to identify the appropriate prepaid account. Also, specific replenishment telephone numbers may be predesignated for selected replenishment amounts, such as "1-800-555-2525" for a $25 replenishment transaction or "1-800-555-5050" for a $50 replenishment. Accordingly, the user could dial "1-800-555-2525" from telephone 113 and the answering replenishment IVR system would know that the user desired a $25 replenishment. The answering IVR system would also identify telephone 113, the associated prepaid account and the preselected debit account information based upon the caller ID from telephone 113. As a result to complete the transaction, the IVR system would only need to prompt the user for a password or PIN to complete the transaction. The replenishment IVR system would then provide the user with a transaction number or confirmation number. A receipt including the transaction number and the transaction amount may also be sent to the user via electronic, SMS, or regular mail. Replenishment system 101 updates the prepaid account balance in prepaid engine 103 and performs an electronic banking transaction with bank 102 to move the funds among the appropriate accounts.

It will be further understood that the present invention may be used to replenish any prepaid accounts without regard to how the prepaid account is used. Funds may be added to any prepaid account using the systems and methods described herein. Funds may also be used to pay existing post paid or credit accounts, such as normal phone bills or utility bills including cable or telephone bills. Many people use prepaid credit cards that can be used to make purchases at any location that accepts regular credit cards. These prepaid credit cards may be replenished in the manner described above. For example, the user could present the prepaid credit card at a point of sale location 104 along with a cash amount to be added to the account balance. A clerk at the retail location would then ring up the replenishment transaction for the appropriate amount and swipe the prepaid credit card in an authorization terminal. The transaction would be confirmed by bank 102. In such a transaction, replenishment system 101 may be a dedicated system that is used by bank 102 to perform credit card replenishment transactions.

Although the present invention and its advantages have been described in detail, it should be understood that various changes, substitutions and alterations can be made herein without departing from the spirit and scope of the invention as defined by the appended claims. Moreover, the scope of the present application is not intended to be limited to the particular embodiments of the process, machine, manufacture, composition of matter, means, methods and steps described in the specification. As one of ordinary skill in the art will readily appreciate from the disclosure of the present invention, processes, machines, manufacture, compositions of matter, means, methods, or steps, presently existing or later to be developed that perform substantially the same function or achieve substantially the same result as the corresponding embodiments described herein may be utilized according to the present invention. Accordingly, the appended claims are intended to include within their scope such processes, machines, manufacture, compositions of matter, means, methods, or steps.

What is claimed is:

1. A method of providing prepaid account replenishment services comprising the steps of:
   receiving real time data from a bank, wherein said data comprises information related to a replenishment transaction;
   identifying a prepaid account number from said data;
   sending an update message to a prepaid engine, wherein said update message comprises information regarding an amount of money to be added to said prepaid account;
   receiving summary data from said bank, wherein said summary data comprises information related to a plurality of replenishment transactions;
   reconciling individual replenishment transactions by comparing said real time data with said summary data; and
   sending a disbursement message to said bank, wherein said disbursement message comprises information regarding the distribution of funds associated with said replenishment transactions.

2. A method of providing prepaid account services to consumers comprising the steps of:
   assigning prepaid accounts to said consumers;
   associating said prepaid accounts with wireless telephones;
   communicating with a banking network regarding consumer replenishment transactions, wherein said communicating with said banking network step further comprises the steps of:
     receiving transaction messages following individual replenishment transactions by said consumers, wherein said receiving transaction messages step further comprises:
       verifying that permanent account numbers have been activated;
     receiving a reconciliation message summarizing all individual transactions that occurred during a certain period;
     reconciling said individual transactions; and
     sending a message indicating the disbursement of funds associated with said replenishment transactions;
   communicating with a prepaid engine regarding said consumer replenishment transactions; and
   sending a disbursement message to said banking network, wherein said disbursement message comprises information regarding the distribution of funds associated with said replenishment transactions.

3. A system for replenishing prepaid accounts wherein real-time data is received from a bank, said real-time data comprising information related to a replenishment transaction and said data identifying a prepaid account, wherein the system comprises:
   a non-transitory computer readable medium with computer program logic recorded thereon, which when executed by a processor performs the steps of:
     sending a message to a prepaid engine from a replenishment system, wherein said update message comprises information regarding an amount of money to be added to said prepaid account;
     receiving summary data from said bank, wherein said summary data comprises information related to a plurality of said replenishment transactions;
     reconciling individual replenishment transactions by comparing said real time data with said summary data;
     sending a disbursement message to said bank, wherein said disbursement message comprises information regarding the distribution of funds associated with said replenishment transactions; and
     verifying that permanent account numbers have been activated.

4. The system of claim 3 wherein said bank is a banking institution.

5. The system of claim 3 wherein said bank is an entity that supports financial transactions over a point of sale network.

6. The system of claim 3 wherein the non-transitory computer readable medium with computer program logic recorded thereon, when executed by a processor, performs the step of:

verifying location identification information associated with real time data from said bank, wherein said location identification information identifies authorized replenishment locations.

7. The system of claim 3 wherein the non-transitory computer readable medium with computer program logic recorded thereon, when executed by a processor, performs the step of:

verifying that transaction identifiers associated with real time data from said bank are not duplicates.

8. The system of claim 3 wherein the non-transitory computer readable medium with computer program logic recorded thereon, when executed by a processor, performs the steps of:

identifying replenishment transactions that are in variance with information contained in said summary data; and logging identified replenishment transactions into an exception file.

* * * * *

UNITED STATES PATENT AND TRADEMARK OFFICE
CERTIFICATE OF CORRECTION

| | |
|---|---|
| PATENT NO. | : 8,095,463 B1 |
| APPLICATION NO. | : 09/365426 |
| DATED | : January 10, 2012 |
| INVENTOR(S) | : Peter Hartmaier |

It is certified that error appears in the above-identified patent and that said Letters Patent is hereby corrected as shown below:

In the Specification

Column 4, line 12:
"exemplary system 10" should read -- exemplary system 101 --.

Column 4, lines 62-63:
"replenishment system 103" should read -- replenishment system 101 --.

Column 4, line 65:
"replenishment system 103" should read -- replenishment system 101 --.

Signed and Sealed this
Ninth Day of June, 2015

Michelle K. Lee
*Director of the United States Patent and Trademark Office*